United States Patent
Liu et al.

(10) Patent No.: US 11,955,678 B2
(45) Date of Patent: Apr. 9, 2024

(54) METHOD TO IMPROVED REDOX FLOW BATTERY PERFORMANCE

(71) Applicant: UOP LLC, Des Plaines, IL (US)

(72) Inventors: Chunqing Liu, Arlington Heights, IL (US); Chaoyi Ba, Schaumburg, IL (US); Xueliang Dong, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 156 days.

(21) Appl. No.: 17/474,200

(22) Filed: Sep. 14, 2021

(65) Prior Publication Data

US 2023/0085103 A1    Mar. 16, 2023

(51) Int. Cl.
*H01M 8/18*        (2006.01)
*H01M 4/86*        (2006.01)
*H01M 4/88*        (2006.01)

(52) U.S. Cl.
CPC ......... *H01M 8/188* (2013.01); *H01M 4/8657* (2013.01); *H01M 4/8853* (2013.01); *H01M 8/18* (2013.01); *H01M 2004/8684* (2013.01); *H01M 2300/0002* (2013.01)

(58) Field of Classification Search
None
See application file for complete search history.

(56) References Cited

U.S. PATENT DOCUMENTS

| | | |
|---|---|---|
| 4,192,910 A | 3/1980 | Giner et al. |
| 2020/0176198 A1 | 6/2020 | Adams |
| 2022/0278340 A1* | 9/2022 | Song .................. H01M 8/0247 |

FOREIGN PATENT DOCUMENTS

| | | |
|---|---|---|
| CN | 107978775 A | 5/2018 |
| CN | 113130955 A | 7/2021 |
| JP | 2020508549 A | 3/2020 |
| KR | 20190140043 A | 12/2019 |

OTHER PUBLICATIONS

International Search Report from corresponding PCT application No. PCT/US2022/076291, dated Dec. 20, 2022.
Written Opinion from corresponding PCT application No. PCT/US2022/076291, completed on Dec. 20, 2022.
Liu, Chunqing et al., U.S. Appl. No. 17/388,950, filed Jul. 29, 2021, entitled Ionically Conductive Asymmetric Composite Membranes for Electrochemical Energy Storage Applications.

(Continued)

*Primary Examiner* — Jonathan Crepeau

(57) ABSTRACT

Methods to improve redox flow battery performance with improved CE, reduced electrolyte solution crossover, and simplified solution refreshing process have been developed. The methods include controlling the pre-charging degree and conditions to allow high quality metal plating (ductile and uniform), for example, Fe(O), on the negative electrode. Control of the pre-charging conditions can be combined with increasing the concentration of metal ions compared to existing systems, while maintaining the same concentration in both the negative and positive electrolytes, or increasing the concentration of metal ions in the negative electrolyte so that the negative electrolyte has a higher concentration of metal ions than the positive electrolyte.

17 Claims, 1 Drawing Sheet

(56) References Cited

OTHER PUBLICATIONS

Liu, Chunqing et al., U.S. Appl. No. 17/388,956, filed Jul. 29, 2021, entitled Sandwich-Structured Thin Film Composite Anion Exchange Membrane for Redox Battery Applications.
Liu, Chunqing et al., U.S. Appl. No. 17/389,032, filed Jul. 29, 2021, entitled Ionically Conductive Thin Film Composite Membranes for Energy Storage Applications.
Liu, Chunqing et al., U.S. Appl. No. 17/388,962, filed Jul. 29, 2021, entitled Electrolyte Compositions for Redox Flow Batteries.

* cited by examiner

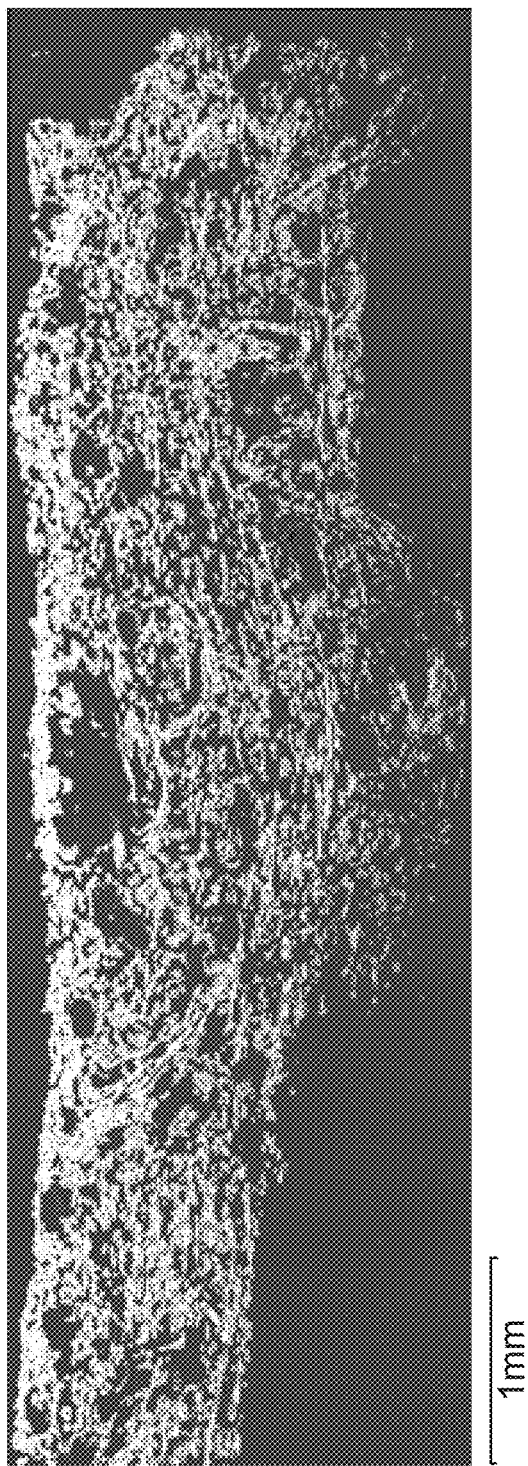

METHOD TO IMPROVED REDOX FLOW BATTERY PERFORMANCE

BACKGROUND OF THE INVENTION

Energy storage systems have played a key role in harvesting energy from various sources. The energy storage systems can be used to store energy and convert it for use in many different applications, such as building, transportation, utility, and industry. A variety of energy storage systems have been used commercially, and new systems are currently being developed. Energy storage types can be categorized as electrochemical and battery, thermal, thermochemical, flywheel, compressed air, pumped hydropower, magnetic, biological, chemical and hydrogen energy storages. The development of cost-effective and eco-friendly energy storage systems is needed to solve the energy crisis and to overcome the mismatch between generation and end use.

Renewable energy sources, such as wind and solar power, have transient characteristics, which require energy storage. Renewable energy storage systems such as redox flow batteries (RFBs) have attracted significant attention for electricity grid, electric vehicles, and other large-scale stationary applications. RFB is an electrochemical energy storage system that reversibly converts chemical energy directly to electricity. The conversion of electricity via water electrolysis into hydrogen as an energy carrier without generation of carbon monoxide or dioxide as byproducts enables a coupling of the electricity, chemical, mobility, and heating sectors. Water electrolysis produces high quality hydrogen by electrochemical splitting of water into hydrogen and oxygen. Water electrolysis has zero carbon footprint when the process is operated by renewable power sources, such as wind, solar, or geothermal energy. The main water electrolysis technologies include alkaline electrolysis, polymer electrolyte membrane (PEM) electrolysis, and solid oxide electrolysis. PEM water electrolysis is one of the favorable methods for conversion of renewable energy to high purity hydrogen with the advantages of compact design, high current density, high efficiency, fast response, small footprint, lower temperature (20-90° C.) operation, and high purity oxygen byproduct.

RFBs are composed of two external storage tanks filled with active materials comprising metal ions that may be in different valance states, two circulation pumps, and a flow cell with a separation membrane. The separation membrane is located between the anode and the cathode and is used to separate the anolyte and the catholyte, as well as to utilize the current circuit by allowing the transfer of balancing ions. Among all the redox flow batteries developed to date, all vanadium redox flow batteries (VRFB) have been the most extensively studied. VRFB uses the same vanadium element in both half cells which prevents crossover contamination of electrolytes from one half cell to the other half cell. VRFB, however, is inherently expensive due to the use of high cost vanadium and an expensive membrane. All-iron redox flow batteries (IFB) are particularly attractive for grid scale storage applications due to the use of low cost and abundantly available iron, salt, and water as the electrolyte and the non-toxic nature of the system.

The membrane is one of the key materials that make up a battery or electrolysis cell as a key driver for safety and performance. Some important properties for membranes for flow batteries, fuel cells, and membrane electrolysis include high conductivity, high ionic permeability (porosity, pore size and pore size distribution), high ionic exchange capacity (for ion-exchange membrane), high ionic/electrolyte selectivity (low permeability/crossover to electrolytes), low price (less than $150-200/m$^2$), low area resistance to minimize efficiency loss resulting from ohmic polarization, high resistance to oxidizing and reducing conditions, chemically inert to a wide pH range, high thermal stability together with high proton conductivity (greater than or equal to 120° C. for fuel cell), high proton conductivity at high T without $H_2O$, high proton conductivity at high T with maintained high RH, and high mechanical strength (thickness, low swelling).

The two main types of membranes for redox flow battery, fuel cell, and electrolysis applications are polymeric ion-exchange membranes and microporous separators. The polymeric ion-exchange membranes can be cation-exchange membranes comprising —$SO_3^-$, —$COO^-$, —$PO_3H^-$, —$PO_3H^-$, or —$C_6H_4O^-$ cation exchange functional groups, anion-exchange membranes comprising —$NH_3^+$, —$N_2^+$, —$NR_2H^+$, or —$NR_3^+$ anion exchange functional groups, or bipolar membranes comprising both cation-exchange and anion-exchange polymers. The polymers for the preparation of ion-exchange membranes can be perfluorinated ionomers such as Nafion®, Flemion®, and NEOSEPTA®-F, partially fluorinated polymers, non-fluorinated hydrocarbon polymers, non-fluorinated polymers with aromatic backbone, or acid-base blends. In general, perfluorosulfonic acid (PFSA)-based membranes, such as Nafion® and Flemion®, are used in vanadium redox flow battery (VRFB) systems due to their oxidation stability, good ion conductivity, unique morphology, mechanical strength, and high electrochemical performance. However, these membranes have low balancing ions/electrolyte metal ion selectivity, and high electrolyte metal ion crossover which causes capacity decay in VRFBs, and they are expensive.

The microporous and nanoporous membrane separators can be inert microporous/nanoporous polymeric membrane separators, inert non-woven porous films, or polymer/inorganic material coated/impregnated separators. The inert microporous/nanoporous polymeric membrane separators can be microporous polyethylene (PE), polypropylene (PP), PE/PP, or composite inorganic/PE/PP membrane, inert non-woven porous films, non-woven PE, PP, polyamide (PA), polytetrafluoroethylene (PTFE), polyvinyl chloride (PVC), polyvinylidene fluoride (PVDF), polyethylene terephalate (PET), or polyester porous film. For example, microporous Daramic® and Celgard® membrane separators made from PE or PP polymer are commercially available. They normally have high ionic conductivity, but also high electrolyte cross-over for RFB applications.

Another important component in redox flow batteries (RFBs) is the electrolyte solution. Typical electrolyte solutions may include electrolytes, supporting redox inactive electrolytes, and electrolyte additives. All-iron RFBs have iron in different valence states as both the positive and negative electrolytes for the positive and negative electrodes, respectively. The supporting redox inactive electrolytes for all-iron RFBs can be NaCl, KCl, $NH_4Cl$, or $Na_2SO_4$. The positive electrolyte, negative electrolyte, positive electrode, and negative electrode may also be referred to as redox electrolyte or catholyte, plating electrolyte or anolyte, redox electrode or cathode, and plating electrode or anode, respectively. The iron-based positive and negative electrolyte solutions stored in the external storage tanks flow through the stacks of the batteries. The cathode side half-cell reaction involves $Fe^{2+}$ losing electrons to form $Fe^{3+}$ during charge and $Fe^{3+}$ gaining electrons to form $Fe^{2+}$ during discharge. The anode side half-cell reaction involves the deposition and dissolution of iron in the form of a solid plate.

One issue for current all iron RFB systems is that the high depth of discharge (DoD) results in electrolyte solution crossover from the negative side to the positive side due to osmotic pressure, resulting a rapid decrease in the battery performance. For example, with 1.5 M $FeCl_2$ in both the negative and positive electrolyte solutions and 75% DoD, all of the negative electrolyte moved to the positive side during charging.

Another issue for all iron RFB systems is $H_2$ evolution reaction during charging. As the battery is charging, hydrogen is formed on the negative side of the battery as $Fe^{2+}$ is plated on the electrode as $Fe^0$. Meanwhile, losses are minimal on positive side. Therefore, there is more $Fe^{3+}$ in the positive solution for each cycle until there is no more $Fe^{2+}$ available for charging the battery. The formation of $H_2$ results in low coulombic efficiency (CE).

Plating electrode: $Fe^{2+}+2e^- \leftrightarrow Fe^0$ $E^0=-0.44V$ $2H^+ + 2e^- \leftrightarrow H_2$ (g) $E_0=-0.00V$ Redox electrode: $2Fe^{2+} \leftrightarrow Fe^{3+} 2e^-$ $E^0=+0.77V$ The design of all-iron RFBs, particularly the compositions of the electrolyte solutions, the separation membrane, and the electrodes, is an important factor in determining the total amount of energy that can be stored in the battery system. The compositions of the positive and negative electrolyte solutions significantly influence the performance and the cost of the all-iron RFBs.

Despite the significant research efforts, the wide adoption of redox flow batteries for grid energy storage applications is still a challenge.

Therefore, there is a need for battery systems and methods which provide stable, high performance positive and negative electrolyte solutions for redox flow battery applications to improve CE, reduced electrolyte crossover, and a simplified solution refreshing process.

BRIEF DESCRIPTION OF THE DRAWING

The FIGURE is an HRSEM image of the cross-sectional view of a pre-plated negative electrode.

DESCRIPTION OF THE INVENTION

Methods to improve redox flow battery performance with improved CE, reduced electrolyte solution crossover, and simplified solution refreshing process have been developed.

The pre-charging degree and conditions may be controlled to allow high quality metal plating (ductile and uniform), for example, Fe(O), on the negative electrode. The plated metal on the negative electrode functions as 'seeds" to facilitate further metal plating/stripping during charging/discharging. The reaction kinetics of metal plating/stripping are improved, and hydrogen evolution is suppressed, resulting in high CE. Longer charge time with higher state of charge (SoC) resulted in more cycles and higher CE compared to shorter charge time and lower SoC.

Control of the pre-charging conditions can be combined with increasing the concentration of metal ions compared to existing systems, while maintaining the same concentration in both the negative and positive electrolytes. For example, in an Fe redox flow battery system, when the final negative and positive electrolyte solutions after pre-charging comprise 2.5 M $FeCl_2$ (compared to 1.5 M in the electrolyte solutions), the SoC could be reduced from 75% to 45% with the same amount of energy storage per volume (energy density) as the low 1.5M concentration. Increasing the pump rate for the positive electrolyte solution can reduce concentration polarization and further improve battery performance. Using the same electrolyte solution and the same metal ion concentration for the negative and positive electrolyte solutions simplifies the solution refreshing process.

Alternatively, control of the pre-charging conditions can be combined with increasing the concentration of metal ions in the negative electrolyte so that the negative electrolyte has a higher concentration of metal ions than the positive electrolyte. For example, the final positive and negative electrolyte solutions after pre-charging can have different $FeCl_2$ concentrations, such as 2.5 M for the negative electrolyte solution and 1.5 M for the positive electrolyte solution to balance $Fe^{2+}$ concentration in the negative electrolyte, and $Fe^{2+}/Fe^{3+}$ total concentration in the positive electrolyte to reduce or prevent solution crossover. In some embodiments, the volume of the positive electrolyte on the positive side of the cell is greater than the volume of negative electrolyte on the negative side of the cell. However, the solution refreshing process is more complicated when different concentrations of are used.

A hydrogen recombination reactor may be used to reduce metal ions for the positive electrolyte solution, for example, $Fe^{3+}$ to $Fe^{2+}$. The $Fe^{2+}$ concentration in the negative electrolyte solution is adjusted back to a higher concentration, such as 2.5 M (e.g., using higher concentration $Fe^{2+}$ solution), after pre-charging and before starting up the charging/discharging cycles.

The positive and negative electrolyte solutions may be changed to new solutions with the desired compositions and concentrations after pre-charging and before starting up the charging/discharging cycles.

The methods involve pre-plating the negative electrode of a redox battery flow system by pre-charging the redox flow battery system to pre-plate metal on the negative electrode. The redox flow battery system comprises at least one rechargeable cell comprising a positive electrolyte, the negative electrolyte, and a membrane positioned between the positive electrolyte and the negative electrolyte. The positive electrolyte is in contact with a positive electrode, and the negative electrolyte is in contact with the negative electrode. The redox flow battery system further comprises external positive and negative electrolyte storage tanks for the positive and negative electrolytes, and positive and negative electrolyte circulation pumps in fluid communication with the positive and negative electrolytes of rechargeable cell and the external positive and negative electrolyte storage tanks. The positive and negative electrolytes are circulating during the metal pre-plating.

The metal being pre-plated depends on the type of redox flow battery system. Suitable metals include, but are not limited to, Fe and Zn.

The electrolyte solutions depend on the type of redox flow battery system and the metals being pre-plated. For an Fe redox flow battery system, suitable iron precursors, include, but are not limited to, $FeCl_2$, $FeCl_3$, $FeSO_4$, $Fe_2(SO_4)_3$, FeO, Fe, $Fe_2O_3$, or combinations thereof. For a Zn-based hybrid redox flow battery system, such as Zn—Fe, Zn—Ce, Zn—Ni, Zn-chloride, Zn-iodine, or Zn-bromine redox flow battery system, suitable Zn precursors for the negative electrolyte, include, but are not limited to, ZnO, $ZnCl_2$, $ZnBr_2$, $ZnI_2$, $Zn(CH_3SO_3)_2$, a mixture of $ZnCl_2$ and $FeCl_2$, $Na_2[Zn(OH)_4]$, or combinations thereof.

Metal ions, halogens, or polyhalide ions in the positive electrolyte can be reduced using a hydrogen recombination reactor. The hydrogen recombination reactor is a chemical reactor, a catalytic reactor, or an electrochemical reactor.

The metal concentration in the negative electrolyte can be adjusted to a final concentration after pre-charging and before initiating a charging/discharging cycle. The metal concentration can be adjusted by adding a solution having a concentration higher than the final concentration to the negative electrolyte, or replacing the negative electrolyte used in pre-plating the negative electrode of the redox flow battery system with fresh negative electrolyte having the final concentration, for example.

The positive electrolyte used during the negative electrode pre-plating process can be replaced with fresh positive electrolyte having a desired final concentration before initiating the charging/discharging cycle.

The pre-charging conditions include, but are not limited to, charge time, current density, SoC, volume and concentration of the negative electrolyte. The charge time is typically in the range of four hours to 120 hours, or four hours to 50 hours, or 8 hours to 24 hours.

The current density is typically in a range of 2 mA/cm$^2$ to 40 mA/cm$^2$, or 5 mA/cm$^2$ to 30 mA/cm$^2$, or 10 mA/cm$^2$ to 20 mA/cm$^2$.

The SoC for the negative electrolyte is typically less than 75%, or less than 70%, or less than 65%, or less than 60%, or less than 55%, or less than 50%, or less than 45%, and is higher than 10%.

The volume and concentration of the negative electrolyte for pre-plating can vary significantly depending on the type of redox flow batteries with metal pre-plating on the anode. The metal ion concentration in the negative electrolyte can be as low as 0.5 M and can be as high as 10.0 M. The volume of the negative electrolyte for pre-plating can be determined by the desired amount of metal that will be pre-plated on the anode.

The volume of positive electrolyte on the positive side of the cell may be the same as or different from the volume of negative electrolyte on the negative side.

The amount of pre-plated metal on the negative electrode will vary depending on the type of redox flow battery system. For example, the amount of pre-plated Fe(O) on the negative electrode of the iron redox flow battery system is in a range of 0.02 g/cm$^2$ to 1.5 g/cm$^2$.

The CE of the redox flow battery system may be at least 90%, or at least 92%, or at least 94%, or at least 95%, or at least 96%, or at least 97%, or at least 98%, or at least 99%, or at least 100%.

The negative and positive electrolytes can be pre-circulated for 1 h to 10 h before initiating pre-charging the redox flow battery system.

The operating temperature of the redox flow battery system is in a range of 10° C. to 90° C., or 20° C. to 65° C., or 20° C. to 50° C.

The positive electrolyte for pre-plating process in the iron redox flow battery system may comprise water, an amino acid, an inorganic acid, a metal precursor, a supporting electrolyte, and optionally boric acid.

The metal precursor depends on the metal being pre-plated. For example, for an iron redox flow battery system, the iron precursor may comprise $FeCl_2$, $FeCl_3$, $FeSO_4$, $Fe_2(SO_4)_3$, FeO, Fe, $Fe_2O_3$, or combinations thereof.

The supporting electrolyte depends on the type of redox flow battery. For example, for an iron redox flow battery system, the supporting electrolyte may comprise LiCl, NaCl, $Na_2SO_4$, KCl, $NH_4Cl$, or combinations thereof.

Suitable amino acids in the iron redox flow battery system include, but are not limited to, glycine, aspartate, asparagine, glutamate, glutamine, alanine, valine, leucine, isoleucine, methionine, serine, cysteine, threonine, or combinations thereof.

Suitable inorganic acids iron redox flow battery system include, but are not limited to, HCl, $H_2SO_4$, $H_3PO_4$, or combinations thereof.

The negative electrolyte comprises water, the metal precursor, the supporting electrolyte, and optionally a negative electrolyte additive.

For an iron redox flow battery system, the iron precursor may comprise $FeCl_2$, $FeCl_3$, $FeSO_4$, $Fe_2(SO_4)_3$, FeO, Fe, $Fe_2O_3$, or combinations thereof.

For an iron redox flow battery system, the supporting electrolyte may comprise LiCl, NaCl, $Na_2SO_4$, KCl, $NH_4Cl$, or combinations thereof.

For an iron redox flow battery system, the negative electrolyte additive may comprise boric acid or a combination of boric acid and a second amino acid.

Suitable second amino acids for an iron redox flow battery system include, but are not limited to, glycine, aspartate, asparagine, glutamate, glutamine, alanine, valine, leucine, isoleucine, methionine, serine, cysteine, threonine, or combinations thereof. In some embodiments, there is no second amino acid.

The concentration of the metal precursor in the negative electrolyte depends on the type of redox flow battery system. The concentration of the metal precursor in the negative electrolyte of the iron redox flow battery system is typically in the range of 1.0-4.5 M, or 1.5-3.0 M. The concentration of the supporting electrolyte is typically in the range 1.0-4.0 M, or 2.0-4.0 M. The concentration of the negative electrolyte additive is typically in the range of 0.01-2.0 M, or 0.05-0.5 M.

The iron precursors in the positive electrolyte and the negative electrolyte of the iron redox flow battery system may be the same or different. The concentrations of the iron precursors in the positive electrolyte and the negative electrolyte may be the same or different.

The supporting electrolyte in the positive electrolyte and the negative electrolyte of the iron redox flow battery system may be the same or different. The concentrations of the supporting electrolyte in the positive electrolyte and the negative electrolyte may be the same or different.

The amino acid in the positive and negative electrolytes of the iron redox flow battery system could be the same or different.

Boric acid may be present in either or both of the positive and negative electrolytes of the iron redox flow battery system.

For an Fe redox flow battery system when the positive and negative electrolytes have the same concentration of metal ions, the negative electrolyte may comprise $FeCl_2$ at a concentration of 1.5-4.5 M, KCl or $NH_4Cl$, optionally boric acid, and optionally glycine, and optionally $FeCl_3$. The positive electrolyte may comprise $FeCl_2$ at a concentration of 1.5-4.5 M, KCl or $NH_4Cl$, HCl, and glycine, optionally boric acid, and optionally $FeCl_3$. In one embodiment, the negative electrolyte may comprise $FeCl_2$ at a concentration of 1.5-4.5 M, KCl or $NH_4Cl$ at a concentration of 1.0-3.5 M, optionally boric acid at a concentration of 0.01-1.0 M, optionally glycine at a concentration of 0.01-3.0 M, and optionally $FeCl_3$ at a concentration of 0.1-1.0 M. The positive electrolyte may comprise $FeCl_2$ at a concentration of 1.5-4.5 M, KCl or $NH_4Cl$ at a concentration of 1.0-3.5 M, HCl at a concentration of 0.05-2.5 M, and glycine at a concentration of 0.01-3.0 M, optionally boric acid at a concentration of 0.01-1.0 M, and optionally $FeCl_3$ at a concentration of 0.1-1.0 M.

For an Fe redox flow battery system when the positive and negative electrolytes have different concentrations of metal ions with the negative electrolyte having a higher concentration than the positive electrolyte, the negative electrolyte may comprise $FeCl_2$ at a concentration of 2.5-4.5 M, KCl or $NH_4Cl$, optionally boric acid, optionally glycine, and optionally $FeCl_3$. The positive electrolyte may comprise $FeCl_2$ at a concentration of 1.5-4.5 M, KCl or $NH_4Cl$, HCl, and glycine, optionally boric acid, and optionally $FeCl_3$.

The positive electrode in the redox flow battery system may comprise a non-metallic electrode. The negative electrode in the redox flow battery system may comprise a non-metallic or metallic electrode.

The membrane may comprise an ionically conductive membrane. The ionically conductive membrane can be any ionically conductive membrane. Suitable ionically conductive membranes include, but are not limited to, an ionically conductive thin film composite membrane, an ionically conductive asymmetric composite membrane, sandwich-structured thin film composite anion exchange membrane, an anion exchange membrane, or a cation exchange membrane.

Suitable ionically conductive membranes include, but are not limited to, an ionically conductive thin film composite (TFC) membrane comprising a microporous support membrane and a hydrophilic ionomeric polymer coating layer on a surface of the microporous support membrane, wherein the hydrophilic ionomeric polymer coating layer is ionically conductive, a cation-exchange membrane comprising $—SO_3^-$, $—COO^-$, $—PO_3^{2-}$, $—PO_3H^-$, or $—C_6H_4O^-$ cation exchange functional groups, an anion-exchange membrane comprising $—NH_3^+$, $—NRH_2^+$, $—NR_2H^+$, or $—NR_3^+$ anion exchange functional groups, or a bipolar membrane comprising both cation-exchange and anion-exchange polymers. The cation-exchange membrane can comprise a perfluorinated ionomer selected from, but is not limited to, Nafion®, Flemion®, NEOSEPTA®-F, a partially fluorinated polymer, a non-fluorinated hydrocarbon polymer, a non-fluorinated polymer with aromatic backbone, an acid-base blend, or combinations thereof.

One example of a suitable ionically conductive membrane comprises an ionically conductive thin film composite (TFC) membrane comprising a microporous support membrane and a hydrophilic ionomeric polymer coating layer on a surface of the microporous support membrane, wherein the hydrophilic ionomeric polymer coating layer is ionically conductive. The TFC membrane is described in U.S. application Ser. No. 17/389,032, filed Jul. 29, 2021, entitled Ionically Conductive Thin Film Composite Membranes for Energy Storage Applications, which is incorporated herein by reference in its entirety.

Another example of a suitable ionically conductive membrane comprises an ionically conductive asymmetric composite membrane comprising a microporous support membrane and an asymmetric hydrophilic ionomeric polymer coating layer on a surface of the microporous substrate layer, the coating layer made of a hydrophilic ionomeric polymer, the coating layer comprising: a porous layer having a first surface and a second surface, the first surface of the porous layer on the surface of the microporous substrate layer; and a nonporous layer on the second surface of the porous layer; wherein the microporous substrate membrane is made from a polymer different from the hydrophilic ionomeric polymer. The asymmetric composite membrane is described in U.S. application Ser. No. 17/388,950, filed Jul. 29, 2021, entitled Ionically Conductive Asymmetric Composite Membranes for Electrochemical Energy Storage Applications, which is incorporated herein by reference in its entirety.

Another example of a suitable ionically conductive membrane comprises a sandwich-structured thin film composite anion exchange membrane comprising a microporous substrate membrane; a first hydrophilic ionomeric polymer coating layer on a surface of the microporous substrate membrane; a cross-linked protonated polymeric polyamine anion exchange layer on a second surface of the first hydrophilic ionomeric polymer coating layer; and a second hydrophilic ionomeric polymer coating layer on a second surface of the cross-linked protonated polymeric polyamine anion exchange layer. The sandwich-structured thin film composite anion exchange membrane is described in U.S. application Ser. No. 17/388,956, filed Jul. 29, 2021, entitled Sandwich-Structured Thin Film Composite Anion Exchange Membrane for Redox Battery Applications, which is incorporated herein by reference in its entirety.

The term "about" means within 10% of the value specified, or within 5%, or within 1%.

EXAMPLES

The following examples are provided to illustrate one or more preferred embodiments of the invention but are not limited embodiments thereof. Numerous variations can be made to the following examples that lie within the scope of the invention.

Comparative Example 1: A Redox Flow Battery System Comprising 1.5 M $FeCl_2$ in the Positive and Negative Electrolytes and without Fe(O) Pre-Plating for the Negative Electrolyte (Abbreviated as Fe-RFB-No-Pre-Plating)

A redox flow battery system comprising 1.5 M $FeCl_2$ in the positive and negative electrolytes and without Fe(O) pre-plating on a negative carbon felt electrode for the negative electrolyte, a positive carbon felt electrode, the negative carbon felt electrode, a membrane, and two circulation pumps was used to evaluate the battery performance without Fe(O) pre-plating. The positive electrolyte comprised 1.5 M $FeCl_2$, 3.5 M $NH_4Cl$, and additives in ultrapure water (18.2 MΩ·cm), and the pH of the electrolyte was adjusted by HCl to 0.8. The negative electrolyte comprised 1.5 M $FeCl_2$, 3.5 M $NH_4Cl$, and additives in ultrapure water (18.2 MΩ·cm), and the pH of the electrolyte was adjusted by HCl to 1.75. The membrane for the test was alginic acid/Daramic® composite membrane as disclosed in Example 6 of in U.S. application Ser. No. 17/389,032, filed Jul. 29, 2021, entitled Ionically Conductive Thin Film Composite Membranes for Energy Storage Applications.

An electrochemical impedance spectroscopy (EIS) with a BCS-810 battery cycling system (Biologic, FRANCE) was used to evaluate the above all-iron redox flow battery system performance using these negative and positive electrolyte formulas without pre-plating at room temperature. The normal battery cycling test was started without the pre-plating step under the testing conditions of charge current density of 30 mA/cm², charge time of 4 h, discharge current density of 30 mA/cm², and discharge time of 4 h. The total cycles, coulombic efficiency (CE), voltage efficiency (VE), and energy efficiency (EE) of the battery system Fe-RFB-no-pre-plating were shown in Table 1.

Comparative Example 2: A Redox Flow Battery System Comprising 1.5 M $FeCl_2$ in the Positive Electrolyte and 2.5 M $FeCl_2$ in the Negative Electrolyte and with Low Fe(O) Pre-Plating Under Low SoC of 6% for the Negative Electrolyte (Abbreviated as Fe-RFB-Low-Pre-Plating-1)

A redox flow battery system comprising 1.5 M $FeCl_2$ in the positive electrolyte and 2.5 M $FeCl_2$ in the negative electrolyte and with low Fe(O) pre-plating on a negative carbon felt electrode under low SoC of 6% for the negative electrolyte, a positive carbon felt electrode, the negative carbon felt electrode, a membrane, and two circulation pumps was used to evaluate the battery performance with low Fe(O) pre-plating. The positive electrolyte comprised 1.5 M $FeCl_2$, 3.5 M $NH_4Cl$, and additives in ultrapure water (18.2 MΩ·cm), and the pH of the electrolyte was adjusted by HCl to 0.8. The negative electrolyte comprised 2.5 M $FeCl_2$, 3.0 M $NH_4Cl$, and additives in ultrapure water (18.2 MΩ·cm), and the pH of the electrolyte was adjusted by HCl to 1.75. The membrane for the test was alginic acid/Daramic® composite membrane as disclosed in Example 6 of in U.S. application Ser. No. 17/389,032, filed Jul. 29, 2021, entitled Ionically Conductive Thin Film Composite Membranes for Energy Storage Applications.

An EIS with a BCS-810 battery cycling system (Biologic, FRANCE) was used to evaluate the above all-iron redox flow battery system performance using these negative and positive electrolyte formulas with low pre-plating at room temperature. The electrolyte solutions were circulated for 2 h, and then the battery was pre-charged at a charge current density of 2 mA/cm$^2$ for 8 h with a SoC of 6% to pre-plate 0.016 g Fe(O)/cm$^2$ of negative electrode. The normal battery cycling test was started after the pre-plating step under the testing conditions of charge current density of 30 mA/cm$^2$, charge time of 4 h, discharge current density of 30 mA/cm$^2$, and discharge time of 4 h. The total cycles, CE, VE, and EE of the battery system Fe-RFB-low-pre-plating-1 were shown in Table 1.

Comparative Example 3: A Redox Flow Battery System Comprising 2.5 M $FeCl_2$ in the Positive and Negative Electrolytes and with Low Fe(O) Pre-Plating Under Low SoC of 6% for the Negative Electrolyte (Abbreviated as Fe-RFB-Low-Pre-Plating-2)

A redox flow battery system comprising 2.5 M $FeCl_2$ in the positive and negative electrolytes and with low Fe(O) pre-plating on a negative carbon felt electrode under low SoC of 6% for the negative electrolyte, a positive carbon felt electrode, the negative carbon felt electrode, a membrane, and two circulation pumps was used to evaluate the battery performance with low Fe(O) pre-plating. The positive and negative electrolytes had the same composition comprising 2.5 M $FeCl_2$, 3.0 M $NH_4Cl$, and additives in ultrapure water (18.2 MΩ·cm), and the pH of the solutions were adjusted by HCl to 1.5. The membrane for the test was alginic acid/Daramic® composite membrane as disclosed in Example 6 of in U.S. application Ser. No. 17/389,032, filed Jul. 29, 2021, entitled Ionically Conductive Thin Film Composite Membranes for Energy Storage Applications.

An EIS with a BCS-810 battery cycling system (Biologic, FRANCE) was used to evaluate the above all-iron redox flow battery system performance using these negative and positive electrolyte formulas with low pre-plating at room temperature. The electrolyte solutions were circulated for 2 h, and then the battery was pre-charged at a charge current density of 2 mA/cm$^2$ for 8 h with a SoC of 6% to pre-plate 0.016 g Fe(O)/cm$^2$ of negative electrode. The normal battery cycling test was started after the pre-plating step under the testing conditions of charge current density of 30 mA/cm$^2$, charge time of 4 h, discharge current density of 30 mA/cm$^2$, and discharge time of 4 h. The total cycles, CE, VE, and EE of the battery system Fe-RFB-low-pre-plating-2 were shown in Table 1.

Example 1: A Redox Flow Battery System Comprising 1.5 M $FeCl_2$ in the Positive and Negative Electrolytes and with Fe(O) Pre-Plating Under SoC of 16.7% for the Negative Electrolyte (Abbreviated as Fe-RFB-Pre-Plating-1)

A redox flow battery system comprising 1.5 M $FeCl_2$ in the positive and negative electrolytes and high Fe(O) pre-plating on a negative carbon felt electrode under SoC of 16.7% for the negative electrolyte, a positive carbon felt electrode, the negative carbon felt electrode, a membrane, and two circulation pumps was used to evaluate the battery performance with Fe(O) pre-plating. The positive electrolyte comprised 1.5 M $FeCl_2$, 3.5 M $NH_4Cl$, and additives in ultrapure water (18.2 MΩ·cm), and the pH of the electrolyte was adjusted by HCl to 0.8. The negative electrolyte comprised 1.5 M $FeCl_2$, 3.5 M $NH_4Cl$, and additives in ultrapure water (18.2 MΩ·cm), and the pH of the electrolyte was adjusted by HCl to 1.75. The membrane for the test was alginic acid/Daramic® composite membrane as disclosed in Example 6 of in U.S. application Ser. No. 17/389,032, filed Jul. 29, 2021, entitled Ionically Conductive Thin Film Composite Membranes for Energy Storage Applications.

An electrochemical impedance spectroscopy (EIS) with a BCS-810 battery cycling system (Biologic, FRANCE) was used to evaluate the above all-iron redox flow battery system performance using these negative and positive electrolyte formulas with pre-plating at room temperature. The electrolyte solutions were circulated for 2 h, and then the battery was pre-charged at a charge current density of 10 mA/cm$^2$ for 16 h with a SoC of 16.7% to pre-plate 0.034 g Fe(O)/cm$^2$ of negative electrode. The normal battery cycling test was started after the pre-plating step under the testing conditions of charge current density of 30 mA/cm$^2$, charge time of 4 h, discharge current density of 30 mA/cm$^2$, and discharge time of 4 h. The total cycles, CE, VE, and EE of the battery system Fe-RFB-pre-plating-1 were shown in Table 1.

Example 2: A Redox Flow Battery System Comprising 1.5 M $FeCl_2$ in the Positive Electrolyte and 2.5 M $FeCl_2$ in the Negative Electrolyte and with Fe(O) Pre-Plating Under SoC of 60% for the Negative Electrolyte (Abbreviated as Fe-RFB-Pre-Plating-2)

A redox flow battery system comprising $FeCl_2$ in the positive and negative electrolytes for high Fe(O) pre-plating on a negative carbon felt electrode under SoC of 60% for the negative electrolyte, a positive carbon felt electrode, the negative carbon felt electrode, a membrane, and two circulation pumps was used to evaluate the battery performance with Fe(O) pre-plating. The membrane for the test was alginic acid/Daramic® composite membrane as disclosed in Example 6 of in U.S. application Ser. No. 17/389,032, filed Jul. 29, 2021, entitled Ionically Conductive Thin Film Composite Membranes for Energy Storage Applications. An EIS with a BCS-810 battery cycling system (Biologic, FRANCE) was used to evaluate the all-iron redox flow battery system performance with pre-plating at room temperature. For the pre-plating step, a positive electrolyte and a negative electrolyte with the same composition were used comprising 2.5 M $FeCl_2$, 3 M $NH_4Cl$, and additives in ultrapure water (18.2 MΩ·cm), and the pH of the electrolyte was 1.5. The positive and negative electrolytes were circulated for 5 h, and then the battery was pre-charged at a charge current density of 10 mA/cm$^2$ for 16 h with a SoC of 60% to pre-plate 0.17 g Fe(O)/cm$^2$ of negative electrode. For the battery cycling test after the pre-plating process, the positive electrolyte was switched to a new positive electrolyte comprising 1.5 M FeCl$_2$, 3 M NH$_4$Cl, and additives in ultrapure water (18.2 MΩ·cm) with a pH of 1.8. The negative electrolyte was switched to a new negative electrolyte comprising 2.5 M FeCl$_2$, 3 M NH$_4$Cl, and additives in ultrapure water (18.2 MΩ·cm) with a pH of 1.75. The normal battery cycling test was started using the new positive and negative electrolytes after the pre-plating step under the testing conditions of charge current density of 30 mA/cm$^2$, charge time of 4 h, discharge current density of 30 mA/cm$^2$, and discharge time of 4 h. The total cycles, CE, VE, and EE of the battery system Fe-RFB-pre-plating-2 were shown in Table 1.

Example 3: A Redox Flow Battery System Comprising 2.5 M FeCl$_2$ in the Positive and Negative Electrolytes and with Fe(O) Pre-Plating Under SoC of 30% for the Negative Electrolyte (Abbreviated as Fe-RFB-Pre-Plating-3)

A redox flow battery system comprising FeCl$_2$ in the positive and negative electrolytes for high Fe(O) pre-plating on a negative carbon felt electrode under SoC of 30% for the negative electrolyte, a positive carbon felt electrode, the negative carbon felt electrode, a membrane, and two circulation pumps was used to evaluate the battery performance with Fe(O) pre-plating. The membrane for the test was alginic acid/Daramic® composite membrane as disclosed in Example 6 of in U.S. application Ser. No. 17/389,032, filed Jul. 29, 2021, entitled Ionically Conductive Thin Film Composite Membranes for Energy Storage Applications. An EIS with a BCS-810 battery cycling system (Biologic, FRANCE) was used to evaluate the all-iron redox flow battery system performance with pre-plating at room temperature. For the pre-plating step, a positive electrolyte and a negative electrolyte with the same composition were used and they comprise 2.5 M FeCl$_2$, 3 M NH$_4$Cl, and additives in ultrapure water (18.2 MΩ·cm), and the pH of the electrolyte was 1.5. The positive and negative electrolytes were circulated for 2 h and then the battery was pre-charged at a charge current density of 10 mA/cm$^2$ for 8 h with a SoC of 30% to pre-plate 0.084 g Fe(O)/cm$^2$ of negative electrode. For the battery cycling test after the pre-plating process, the positive and negative electrolytes were replaced with the fresh electrolytes comprising 2.5 M FeCl$_2$, 3 M NH$_4$Cl, and additives in ultrapure water (18.2 MΩ·cm) with a pH of 1.5. The normal battery cycling test was started using the new positive and negative electrolytes with the same composition after the pre-plating step under the testing conditions of charge current density of 30 mA/cm$^2$, charge time of 4 h, discharge current density of 30 mA/cm$^2$, and discharge time of 4 h. The total cycles, CE, VE, and EE of the battery system Fe-RFB-pre-plating-3 were shown in Table 1.

Example 4: Characterization of a Pre-Plated Negative Electrode

A pre-plated negative electrode was prepared using the same pre-plating conditions as those used in Example 3. A redox flow battery system comprising FeCl$_2$ in the positive and negative electrolytes for high Fe(O) pre-plating on a negative carbon felt electrode under SoC of 60% for the negative electrolyte, a positive carbon felt electrode, the negative carbon felt electrode, a membrane, and two circulation pumps was used to prepare the pre-plated negative electrode. The membrane for the test was alginic acid/Daramic® composite membrane as disclosed in Example 6 of in U.S. application Ser. No. 17/389,032, filed Jul. 29, 2021, entitled Ionically Conductive Thin Film Composite Membranes for Energy Storage Applications. A positive electrolyte and a negative electrolyte with the same composition were used for the pre-plating comprising 2.5 M FeCl$_2$, 3 M NH$_4$Cl, and additives in ultrapure water (18.2 MΩ·cm), and the pH of the electrolyte was 1.5. The positive and negative electrolytes were circulated for 5 h, and then the battery was pre-charged at a charge current density of 10 mA/cm$^2$ for 16 h with a SoC of 60% to pre-plate about 0.17 g Fe(O)/cm$^2$ of negative electrode. The pre-plated negative electrode was cleaned with ultrapure water to remove the remaining electrolyte and dried at 90° C. under vacuum before High Resolution Scanning Electron Microscope (HRSEM) characterization. The HRSEM image of the cross-sectional view of the pre-plated negative electrode are shown in the FIGURE. It can be seen from the FIGURE that Fe(O) was plated around all the micrometer diameter carbon fibers uniformly. Therefore, the active surface area of the pre-plated Fe(O) on the carbon fibers of the negative electrode is high and will promote the uniform plating of Fe(O) during the normal battery charging process.

Example 5: All-Iron Redox Flow Battery Performance Analysis on Various Batteries with Different Pre-Plating Conditions The number of battery charge/discharge cycles, VE, CE, and EE of the all-iron redox flow batteries as described in Examples 1-3 and Comparative Examples 1-3 are shown in Table 1. It can be seen from Table 1 that Example 1 (Fe-RFB-pre-plating-1 battery run) with pre-plating showed significantly improved total battery cycles, VE, CE and EE compared to Comparative Example 1 (Fe-RFB-no-pre-plating battery run) without pre-plating. Example 2 (Fe-RFB-pre-plating-2 battery run) with 0.17 g pre-plated Fe(O)/cm$^2$ on the negative electrode showed longer total battery cycles, and much higher CE and EE than (Comparative Example 2) (Fe-RFB-low-pre-plating-1 battery run) with low pre-plated Fe(O) (0.016 g Fe(O)/cm$^2$) on the negative electrode. Example 3 (Fe-RFB-pre-plating-3 battery run) with 0.084 g pre-plated Fe(O)/cm$^2$ on the negative electrode also showed longer total battery cycles, and much higher CE and EE than Comparative Example 2 (Fe-RFB-low-pre-plating-2 battery run) with low pre-plated Fe(O) (0.016 g Fe(O)/cm$^2$) on the negative electrode. These results demonstrate that the pre-plating of iron on the negative electrode significantly improved the battery performance. The pre-plated iron served as 'seed' to facilitate the further plating and stripping of iron metal, resulting in improved kinetics of plating/stripping and reduced hydrogen evolution.

TABLE 1

All-iron redox flow battery performance for various batteries with different pre-plating conditions[a]

| Battery | # Cycles | VE (%) | CE (%) | EE (%) |
|---|---|---|---|---|
| Fe-RFB-no-pre-plating | 9 | 77.8% | 94.0% | 73.1% |
| Fe-RFB-pre-plating-1 | 17 | 83.6% | 98.1% | 82.0% |
| Fe-RFB-low-pre-plating-1 | 3 | 82.5% | 85.1% | 70.2% |
| Fe-RFB-pre-plating-2 | 11 | 79.7% | 97.1% | 77.4% |

TABLE 1-continued

All-iron redox flow battery performance for various batteries with different pre-plating conditions[a]

| Battery | # Cycles | VE (%) | CE (%) | EE (%) |
|---|---|---|---|---|
| Fe-RFB-low-pre-plating-2 | 10 | 83.1% | 87.5% | 72.7% |
| Fe-RFB-pre-plating-3 | 16 | 83.7% | 97.1% | 81.3% |

[a]Charge current density: 30 mA/cm$^2$; charge time: 4 h; discharge current density: 30 mA/cm$^2$; discharge time: 4 h; # of cycles were counted with ≥ 70% CE.

SPECIFIC EMBODIMENTS

While the following is described in conjunction with specific embodiments, it will be understood that this description is intended to illustrate and not limit the scope of the preceding description and the appended claims.

A first embodiment of the invention is a method of pre-plating a negative electrode of a redox flow battery system in-situ before operating the redox flow battery system comprising pre-charging the redox flow battery system to pre-plate metal on a negative electrode of the redox flow battery system from a negative electrolyte of the redox flow battery system, the redox flow battery system comprising at least one rechargeable cell comprising a positive electrolyte, the negative electrolyte, and a membrane positioned between the positive electrolyte and the negative electrolyte, the positive electrolyte in contact with a positive electrode, the negative electrolyte in contact with the negative electrode, an external positive electrolyte storage tank comprising the positive electrolyte, a positive electrolyte circulation pump in fluid communication with the positive electrolyte of the at least one rechargeable cell and the external positive electrolyte storage tank, an external negative electrolyte storage tank comprising the negative electrolyte, a negative electrolyte circulation pump in fluid communication with the negative electrolyte of the at least one rechargeable cell and the external negative electrolyte storage tank, wherein the negative electrolyte comprises metal ions before and after metal pre-plating, and wherein the negative electrolyte and the positive electrolyte are circulating during the metal pre-plating. An embodiment of the invention is one, any or all of prior embodiments in this paragraph up through the first embodiment in this paragraph wherein the redox flow battery system is an all-iron redox flow battery system and the metal pre-plated on the negative electrode is Fe(O), wherein the negative electrolyte comprises $Fe^{2+}$ before and after the Fe(O) pre-plating, and wherein the positive electrolyte comprises $Fe^{2+}$ before the Fe(O) pre-plating and comprises $Fe^{2+}$ and $Fe^{3+}$ after the Fe(O) pre-plating, and wherein the redox flow battery system is pre-charged at a current density in a range of 2 mA/cm$^2$ to 40 mA/cm$^2$ for 4 h to 120 h to pre-plate the Fe(O) on the negative electrode of the redox flow battery system. An embodiment of the invention is one, any or all of prior embodiments in this paragraph up through the first embodiment in this paragraph wherein the amount of pre-plated Fe(O) on the negative electrode of the redox flow battery system is in a range of 0.02 g/cm$^2$ to 1.5 g/cm$^2$. An embodiment of the invention is one, any or all of prior embodiments in this paragraph up through the first embodiment in this paragraph further comprising reducing the $Fe^{3+}$ to $Fe^{2+}$ in the positive electrolyte using a hydrogen recombination reactor; adjusting a concentration of the $Fe^{2+}$ in the negative electrolyte to a final concentration after pre-charging the redox flow battery system and before initiating a charging/discharging cycle; and initiating at least one charging/discharging cycle. An embodiment of the invention is one, any or all of prior embodiments in this paragraph up through the first embodiment in this paragraph wherein the hydrogen recombination reactor is a chemical reactor, a catalytic reactor, or an electrochemical reactor. An embodiment of the invention is one, any or all of prior embodiments in this paragraph up through the first embodiment in this paragraph wherein adjusting the concentration of the $Fe^{2+}$ in the negative electrolyte to the final concentration comprises adding a solution having a concentration of $Fe^{2+}$ higher than the final concentration to the negative electrolyte, or replacing the negative electrolyte used in pre-plating the negative electrode of the redox flow battery system with fresh negative electrolyte having the final concentration. An embodiment of the invention is one, any or all of prior embodiments in this paragraph up through the first embodiment in this paragraph further comprising replacing the positive electrolyte used in reducing the $Fe^{3+}$ to $Fe^{2+}$ with fresh positive electrolyte having a desired concentration of $Fe^{2+}$ before initiating the charging/discharging cycle. An embodiment of the invention is one, any or all of prior embodiments in this paragraph up through the first embodiment in this paragraph wherein the final concentration of $Fe^{2+}$ in the negative electrolyte and the final concentration of $Fe^{2+}$ in the positive electrolyte before initiating the charging/discharging cycle are the same. An embodiment of the invention is one, any or all of prior embodiments in this paragraph up through the first embodiment in this paragraph wherein the final concentration of $Fe^{2+}$ in the negative electrolyte is higher than the final concentration of $Fe^{2+}$ in the positive electrolyte before initiating the charging/discharging cycle. An embodiment of the invention is one, any or all of prior embodiments in this paragraph up through the first embodiment in this paragraph wherein the negative electrolyte comprises $FeCl_2$ at a concentration of 1.5-4.5 M, KCl or $NH_4Cl$, optionally boric acid, and optionally glycine, and optionally $FeCl_3$; or the positive electrolyte comprises $FeCl_2$ at a concentration of 1.5-4.5 M, KCl or $NH_4Cl$, HCl, and glycine, optionally boric acid, and optionally $FeCl_3$; or both. An embodiment of the invention is one, any or all of prior embodiments in this paragraph up through the first embodiment in this paragraph wherein the negative electrolyte comprises $FeCl_2$ at a concentration of 1.5-4.5 M, KCl or $NH_4Cl$ at a concentration of 1.0-3.5 M, optionally boric acid at a concentration of 0.01-1.0 M, optionally glycine at a concentration of 0.01-3.0 M, and optionally $FeCl_3$ at a concentration of 0.1-1.0 M; or the positive electrolyte comprises $FeCl_2$ at a concentration of 1.5-4.5 M, KCl or $NH_4Cl$ at a concentration of 1.0-3.5 M, HCl at a concentration of 0.05-2.5 M, and glycine at a concentration of 0.01-3.0 M, optionally boric acid at a concentration of 0.01-1.0 M, and optionally $FeCl_3$ at a concentration of 0.1-1.0 M; or both. An embodiment of the invention is one, any or all of prior embodiments in this paragraph up through the first embodiment in this paragraph wherein the negative electrolyte comprises $FeCl_2$ at a concentration of 1.7-4.5 M, KCl or $NH_4Cl$, optionally boric acid, optionally glycine, and optionally $FeCl_3$; and the positive electrolyte comprises $FeCl_2$ at a concentration of 1.5-4.5 M, KCl or $NH_4Cl$, HCl, and glycine, optionally boric acid, and optionally $FeCl_3$; wherein the $FeCl_2$ concentration in the negative electrolyte is higher than the $FeCl_2$ concentration in the positive electrolyte. An embodiment of the invention is one, any or all of prior embodiments in this paragraph up through the first embodiment in this paragraph wherein the state of charge (SoC) when pre-plating the negative electrode is less than 75%. An embodiment of the invention is one, any or all of prior embodiments in this paragraph up through the first embodiment in this paragraph further comprising pumping the positive electrolyte at a higher pump rate than a pump rate for the negative electrolyte. An embodiment of the invention is one, any or all of prior embodiments in this paragraph up through the first embodiment in this paragraph wherein the coulombic efficiency (CE) of the redox flow battery system is at least 90%. An embodiment of the invention is one, any or all of prior embodiments in this paragraph up through the first embodiment in this paragraph further comprising pre-circulating the negative electrolyte and the positive electrolyte for 1 h to 10 h before initiating pre-charging the redox flow battery system. An embodiment of the invention is one, any or all of prior embodiments in this paragraph up through the first embodiment in this paragraph wherein the membrane is an ionically conductive membrane. An embodiment of the invention is one, any or all of prior embodiments in this paragraph up through the first embodiment in this paragraph wherein the ionically conductive membrane is an ionically conductive thin film composite membrane, an ionically conductive asymmetric composite membrane, a sandwich-structured thin film composite anion exchange membrane, an anion exchange membrane, or a cation exchange membrane. An embodiment of the invention is one, any or all of prior embodiments in this paragraph up through the first embodiment in this paragraph wherein the redox flow battery system is a zinc-based flow battery system wherein Zn(O) is pre-plated on the negative electrode. An embodiment of the invention is one, any or all of prior embodiments in this paragraph up through the first embodiment in this paragraph wherein the positive electrode in the redox flow battery system is a non-metallic electrode and the negative electrode in the redox flow battery system is a non-metallic or metallic electrode.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A method of pre-plating a negative electrode of a redox flow battery system in-situ before operating the redox flow battery system comprising:
pre-charging the redox flow battery system to pre-plate metal on a negative electrode of the redox flow battery system from a negative electrolyte of the redox flow battery system, the redox flow battery system comprising at least one rechargeable cell comprising a positive electrolyte, the negative electrolyte, and a membrane positioned between the positive electrolyte and the negative electrolyte, the positive electrolyte in contact with a positive electrode, the negative electrolyte in contact with the negative electrode, an external positive electrolyte storage tank comprising the positive electrolyte, a positive electrolyte circulation pump in fluid communication with the positive electrolyte of the at least one rechargeable cell and the external positive electrolyte storage tank, an external negative electrolyte storage tank comprising the negative electrolyte, a negative electrolyte circulation pump in fluid communication with the negative electrolyte of the at least one rechargeable cell and the external negative electrolyte storage tank, wherein the negative electrolyte comprises metal ions before and after metal pre-plating, and wherein the negative electrolyte and the positive electrolyte are circulating during the metal pre-plating;
wherein the redox flow battery system is an all-iron redox flow battery system and the metal pre-plated on the negative electrode is Fe(O), wherein the negative electrolyte comprises Fe2+ before and after the Fe(O) pre plating, and wherein the positive electrolyte comprises Fe2+ before the Fe(O) pre-plating and comprises Fe2+ and Fe3+ after the Fe(O) pre-plating, and wherein the redox flow battery system is pre-charged at a current density in a range of 2 mA/cm2 to 40 mA/cm2 for 4 h to 120 h to pre-plate the Fe(O) on the negative electrode of the redox flow battery system;
reducing the Fe3+ to Fe2+ in the positive electrolyte using a hydrogen recombination reactor; adjusting a concentration of the Fe2+ in the negative electrolyte to a final concentration after pre-charging the redox flow battery system and before initiating a charging/discharging cycle; and initiating at least one charging/discharging cycle.

2. The method of claim 1 wherein the amount of pre-plated Fe(O) on the negative electrode of the redox flow battery system is in a range of 0.02 g/cm² to 1.5 g/cm².

3. The method of claim 1 wherein the hydrogen recombination reactor is a chemical reactor, a catalytic reactor, or an electrochemical reactor.

4. The method of claim 1 wherein adjusting the concentration of the $Fe^{2+}$ in the negative electrolyte to the final concentration comprises: adding a solution having a concentration of $Fe^{2+}$ higher than the final concentration to the negative electrolyte, or replacing the negative electrolyte used in pre-plating the negative electrode of the redox flow battery system with fresh negative electrolyte having the final concentration.

5. The method of claim 1 further comprising:
replacing the positive electrolyte used in reducing the $Fe^{3+}$ to $Fe^{2+}$ with fresh positive electrolyte having a desired concentration of $Fe^{2+}$ before initiating the charging/discharging cycle.

6. The method of claim 1 wherein the final concentration of $Fe^{2+}$ in the negative electrolyte and the final concentration of $Fe^{2+}$ in the positive electrolyte before initiating the charging/discharging cycle are the same.

7. The method of claim 1 wherein the final concentration of $Fe^{2+}$ in the negative electrolyte is higher than the final concentration of $Fe^{2+}$ in the positive electrolyte before initiating the charging/discharging cycle.

8. The method of claim 1 wherein:
the negative electrolyte comprises $FeCl_2$ at a concentration of 1.5-4.5 M, KCl or $NH_4Cl$, optionally boric acid, and optionally glycine, and optionally $FeCl_3$; or
the positive electrolyte comprises $FeCl_2$ at a concentration of 1.5-4.5 M, KCl or $NH_4Cl$, HCl, and glycine, optionally boric acid, and optionally $FeCl_3$;
or both.

9. The method of claim 8 wherein:
the negative electrolyte comprises $FeCl_2$ at a concentration of 1.5-4.5 M, KCl or $NH_4Cl$ at a concentration of 1.0-3.5 M, optionally boric acid at a concentration of 0.01-1.0 M, optionally glycine at a concentration of 0.01-3.0 M, and optionally $FeCl_3$ at a concentration of 0.1-1.0 M; or the positive electrolyte comprises $FeCl_2$ at a concentration of 1.5-4.5 M, KCl or $NH_4Cl$ at a concentration of 1.0-3.5 M, HCl at a concentration of 0.05-2.5 M, and glycine at a concentration of 0.01-3.0 M, optionally boric acid at a concentration of 0.01-1.0 M, and optionally $FeCl_3$ at a concentration of 0.1-1.0 M;

or both.

10. The method of claim 1 wherein:

the negative electrolyte comprises $FeCl_2$ at a concentration of 1.7-4.5 M, KCl or $NH_4Cl$, optionally boric acid, optionally glycine, and optionally $FeCl_3$; and the positive electrolyte comprises $FeCl_2$ at a concentration of 1.5-4.5 M, KCl or $NH_4Cl$, HCl, and glycine, optionally boric acid, and optionally $FeCl_3$;

wherein the $FeCl_2$ concentration in the negative electrolyte is higher than the $FeCl_2$ concentration in the positive electrolyte.

11. The method of claim 1 wherein the state of charge (SoC) when pre-plating the negative electrode is less than 75%.

12. The method of claim 1 further comprising:

pumping the positive electrolyte at a higher pump rate than a pump rate for the negative electrolyte.

13. The method of claim 1 wherein the coulombic efficiency (CE) of the redox flow battery system is at least 90%.

14. The method of claim 1 further comprising:

pre-circulating the negative electrolyte and the positive electrolyte for 1 h to 10 h before initiating pre-charging the redox flow battery system.

15. The method of claim 1 wherein the membrane is an ionically conductive membrane.

16. The method of claim 15 wherein the ionically conductive membrane is an ionically conductive thin film composite membrane, an ionically conductive asymmetric composite membrane, a sandwich-structured thin film composite anion exchange membrane, an anion exchange membrane, or a cation exchange membrane.

17. The method of claim 1 wherein the positive electrode in the redox flow battery system is a non-metallic electrode and the negative electrode in the redox flow battery system is a non-metallic or metallic electrode.

* * * * *